US009892271B2

(12) United States Patent
Agrawal et al.

(10) Patent No.: US 9,892,271 B2
(45) Date of Patent: Feb. 13, 2018

(54) DEVICE LOCK CONTROL APPARATUS AND METHOD WITH DEVICE USER IDENTIFICATION USING A THERMAL SIGNATURE

(71) Applicant: Motorola Mobility LLC, Chicago, IL (US)

(72) Inventors: Amit Kumar Agrawal, Bangalore (IN); Rachid M Alameh, Crystal Lake, IL (US); Patrick J Cauwels, South Beloit, IL (US)

(73) Assignee: Motorola Mobility LLC, Chicago, IL (US)

( * ) Notice: Subject to any disclaimer, the term of this patent is extended or adjusted under 35 U.S.C. 154(b) by 14 days.

(21) Appl. No.: 14/804,366

(22) Filed: Jul. 21, 2015

(65) Prior Publication Data

US 2017/0024574 A1 Jan. 26, 2017

(51) Int. Cl.
*G06F 11/00* (2006.01)
*G06F 21/62* (2013.01)
*H04L 29/06* (2006.01)
*G06F 21/31* (2013.01)

(52) U.S. Cl.
CPC ............ *G06F 21/62* (2013.01); *G06F 21/31* (2013.01); *H04L 63/0861* (2013.01); *G06F 2221/2139* (2013.01)

(58) Field of Classification Search
CPC ............................ G06F 21/62; H04L 63/0861
USPC ......................................................... 726/260
See application file for complete search history.

(56) References Cited

U.S. PATENT DOCUMENTS

| 8,704,152 | B2 | 4/2014 | Svajda et al. |
| 9,426,525 | B2 | 8/2016 | Soundararajan et al. |
| 2010/0105423 | A1 | 4/2010 | Gupta |
| 2012/0064924 | A1 | 3/2012 | Schapsis et al. |
| 2013/0067566 | A1* | 3/2013 | Oh .......................... G06F 21/31 726/19 |
| 2013/0275771 | A1* | 10/2013 | Moran ...................... G06F 21/32 713/193 |
| 2014/0282877 | A1* | 9/2014 | Mahaffey ............ H04L 63/0853 726/3 |
| 2016/0344856 | A1* | 11/2016 | Alameh ................. H04M 1/725 |

* cited by examiner

*Primary Examiner* — Teshome Hailu
(74) *Attorney, Agent, or Firm* — Cygan Law Offices P.C.; Joseph T. Cygan

(57) ABSTRACT

A device includes a thermal infrared sensor and a processor, operatively coupled to the thermal IR sensor. The processor is configured to determine that the device has been successfully unlocked by a user using a security procedure, obtain a thermal signature for the user using thermal sensor data from the thermal infrared sensor, monitor proximity of the user to the device using the thermal signature and maintain the device unlocked if the thermal signature is detectable and is within the detection proximity of the thermal infrared sensor.

20 Claims, 3 Drawing Sheets

DEVICE LOCK CONTROL APPARATUS AND METHOD WITH DEVICE USER IDENTIFICATION USING A THERMAL SIGNATURE

FIELD OF THE DISCLOSURE

The present disclosure relates generally to electronic devices that provide or incorporate proximity based security systems that lock and prevent access when the user is outside the proximity and more particularly to mobile devices that provide such proximity based security systems.

BACKGROUND

Electronic devices often include security mechanisms that lock the electronic devices to prevent unauthorized users from accessing the devices. These electronic devices may be mobile devices such as, but not limited to, laptop computers, smartphones, smartwatches, etc., or may be more stationary devices such as, but not limited to, desktop computers. The known security mechanisms include, at a minimum, a screensaver that requires a password in order to unlock the screen and gain access to displayed information as well as files and applications that may be running on the particular device.

Some electronic devices may also employ security mechanisms that operation in conjunction with other external devices such as smartcards or other near field communication (NFC) devices. In theory, security of the electronic device access is improved by requiring the external device to be in proximity of the electronic device in order for the electronic device to remain unlocked, to be unlocked or to be amenable to unlocking via a further procedural step such as entering a password, etc. An inherent risk exists with such proximity based systems however, because loss of the external device may result in an unauthorized person obtaining the external device thereby having the ability to access the electronic device. Another risk is that the user may momentarily step away and leave the external device in proximity to the electronic device such that the electronic device remains unlocked, creating a security risk of unauthorized access.

DETAILED DESCRIPTION

Briefly, a disclosed device includes a thermal infrared sensor and a processor, operatively coupled to the thermal IR sensor. The processor is configured to determine that the device has been successfully unlocked by a user using a security procedure, obtain a thermal signature for the user using thermal sensor data from the thermal infrared sensor, monitor proximity of the user to the device using the thermal signature and maintain the device unlocked if the thermal signature is detectable and is within the detection proximity of the thermal infrared sensor.

Figure 1:
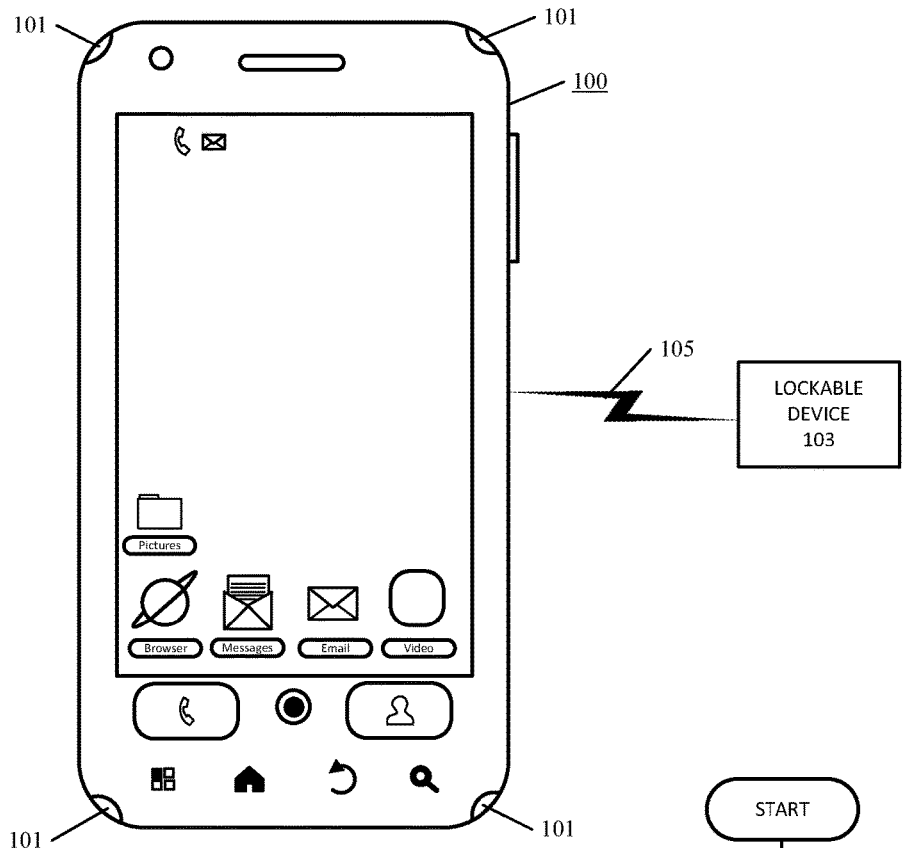
FIG. 1 is a diagram of a device that has an array of heat sensors in accordance with an embodiment and that may provide a locking or unlocking signal to a lockable device in accordance with some embodiments.

Turning now to the drawings wherein like numerals represent like components, FIG. 1 illustrates an example device 100 in accordance with an example embodiment. The example device 100 is a smartphone that incorporates one or more micro-electromechanical systems (MEMS) thermal infrared (IR) sensors 101. Other example devices may be, but are not limited to, a laptop computer, a tablet computer, a personal digital assistant (PDA), an MP3 player, an electronic book reader, or some other device, etc. Any of these example devices may also be referred to herein as a "lockable device" in that each device includes a security mechanism that prevents unauthorized persons from accessing or logging on to the device. Such mechanisms may include, but are not limited to, password protected login screens or screensavers, voice command login using voice recognition, voice password entry or a combination, etc.

In the example embodiment shown in FIG. 1, the device 100 is a lockable device and includes four MEMS thermal IR sensors 101 with each sensor positioned approximately at a corner of the device 100 as shown. The device 100 may also communicate wirelessly via a wireless interface 105 with an external lockable device 103. Using the IR sensors 101, the device 100 can detect a user's thermal signature (also referred to herein as a heat signature or a user's "thermal presence") when the user logs in or unlocks the device 100 using an appropriate security mechanism such as password entry or by using an appropriate voice command. In some embodiments, the device 100 may detect a thermal signature of a user who operates the external lockable device 103 and may send commands over the wireless interface 105 to lock or unlock the lockable device 103 based on the presence of the user's thermal signature.

Each of four IR sensors 101 can detect the presence of a human body and take the environmental temperature versus the human body temperature into account to obtain the user's thermal signature as referred to herein. In one example embodiment, the IR sensors 101 detect temperature within a zero to one foot distance range and can detect proximity within a one foot to eight foot range. In operation, as long as user (presumed owner of the device 100) is in proximity of the device 100 as determined using the IR sensors 101, the device 100 is maintained in an unlocked state.

In some embodiments, the device 100 may also be unlocked using a voice recognition capability. In such embodiments, the device 100 can detect the direction of the voice command and can associate the thermal signature in the voice command direction with the device 100 user/owner. Therefore, if more than one person is present in proximity of the device 100, the voice command direction can be used to distinguish the user's thermal signature from thermal signatures of other persons in proximity.

Therefore, in accordance with the embodiments, the device 100 user/owner's thermal presence is detected when the user unlocks the device 100 either by password entry through a user interface such as a keypad or touchscreen, or by using a voice command if the device has voice recognition capability. The user's thermal signature is then monitored and tracked by the IR sensors 101 to determine if the user remains in proximity of the device 100. The proximity is related to the sensing range of the IR sensors 101. As long as the user is detected within the range or proximity of the device 100 the device 100 may be maintained in an unlocked state. Thus if the user leaves the proximity, or if the user's thermal signature can no longer be detected, the device 100 is placed in a locked state.

Figure 2:
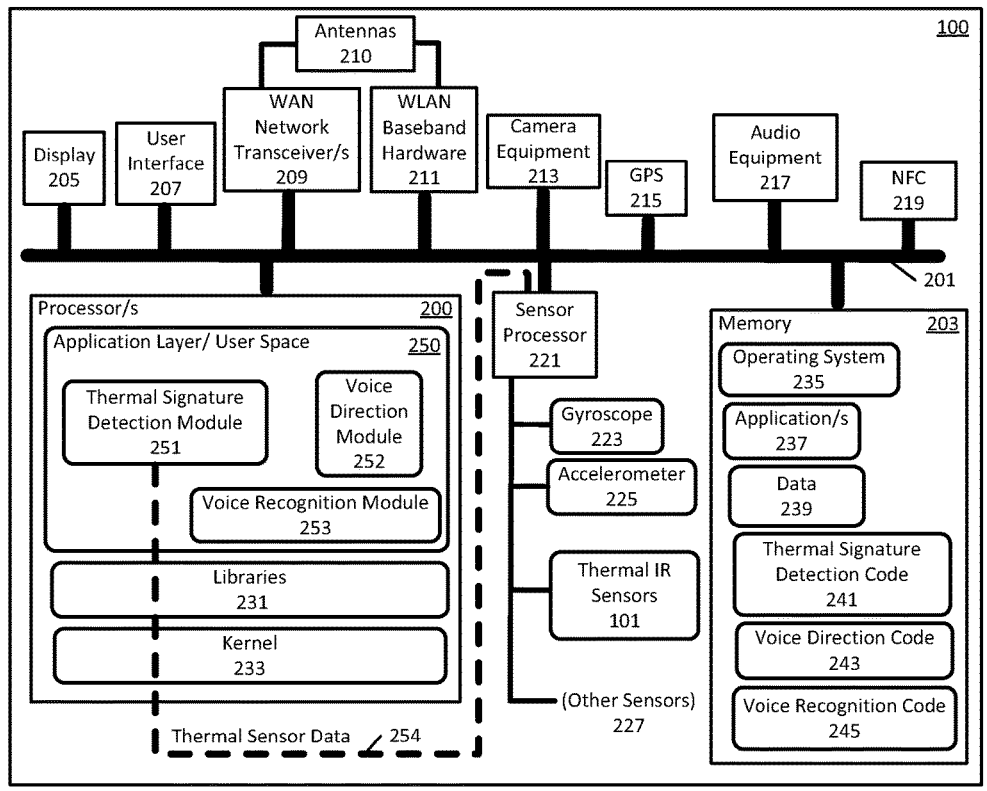
FIG. 2 is a diagram showing further details of a device in accordance with an embodiment.

Further details of an example embodiment of the device 100 are provided in FIG. 2. The device 100 includes one or more processors 200, memory 203, a display 205, user interface 207, one or more wide area network transceivers 209 (such as, but not limited to CDMA, UMTS, GSM, etc.), WLAN baseband hardware 211 (which includes WLAN transceivers capable of implementing IEEE 802.11x radio interfaces or equivalent), one or more antennas 210, camera equipment 213, GPS hardware 215, audio equipment 217, a near field communication (NFC) unit 219, and a sensor processor 221. The device 100 may also include baseband hardware for a "tethering" radio protocol such as, but not limited to, Bluetooth® or Bluetooth® Low Energy, etc. More specifically, the wireless interface 105 may be implementing using a tethering radio protocol or a WLAN radio protocol or by near field communication (NFC). All of the components shown are operatively coupled to the one or more processors 200 by one or more internal communication buses 201. The sensor processor 221 is operative to monitor sensor data from various sensors including a gyroscope 223 and an accelerometer 225, the thermal IR sensors 101, as well as other sensors 227. The gyroscope 223 and accelerometer 225 may be separate or may be combined into a single integrated unit. In some embodiments, the mobile device 100 may include an eCompass that includes the accelerometer 225 and a magnetometer (not shown). The eCompass may be present as an alternative to the gyroscope 223 and accelerometer 225 or may be a separate additional component of the device 100. The combination of the gyroscope 223 and accelerometer 225 or an eCompass, etc. is monitored by the sensor processor 221 such that the device 100 has a positional awareness of its orientation in space with respect to gravity and a location awareness based on location based obtained from GPS hardware 215.

Audio equipment 217 includes speakers, microphones and audio processing. The audio equipment 217 may include, among other things, at least two microphones or a microphone array, at least one speaker, signal amplification, analog-to-digital conversion/digital audio sampling, echo cancellation, etc., which may be applied to one or more microphones and/or one or more speakers.

The memory 203 is non-volatile and non-transitory and stores executable code for an operating system 235 that, when executed by the one or more processors 200, provides an application layer (or user space) 250, libraries 231 (also referred to herein as "application programming interfaces" or "APIs") and a kernel 233. The memory 203 also stores executable code for various applications 237, data 239, thermal signature detection code 241, voice direction code 243, and voice recognition code 245 for implementing a voice recognition engine. The memory 203 may be operatively coupled to the one or more processors 200 via the internal communications buses 201 as shown, may be integrated with the one or more processors 200, or may be some combination of operatively coupled memory and integrated memory.

In addition to applications 237, the one or more processors 200 are operative to launch and execute the thermal signature detection code 241 to implement a thermal signature detection module 251 in accordance with an embodiment. The one or more processors 200 are also operative to launch and execute the voice direction code 243 and the voice recognition code 245 to implement the voice direction module 252 and the voice recognition module 253, respectively. However it is to be understood that the various "modules" described herein can be implemented in other ways that are contemplated by the present disclosure and that the example shown in FIG. 2 is only one possible implementation. For example, the thermal signature detection module 251, voice direction module 252 and the voice recognition module 253 may be separate applications or components or may be integrated together in some embodiments, etc. In one example embodiment, the voice direction module 252 and the voice recognition module 253 may be implemented as one or more application specific integrated circuits (ASICs) that are operatively coupled to the one or more processors 200. Similarly, the thermal signature detection module 251 may be implemented using an ASIC, a digital signal processor (DSP), etc.

Put another way, in the example of FIG. 2, the "modules" are shown implemented as executable instructions executed by the one or more processors 200 that configure the one or more processors 200 to perform the methods of operation according to the embodiments. However, it is to be understood that the modules (also referred to herein as "components") may be implemented as hardware, or as a combination of hardware and software/firmware. In embodiments in which one or more of these modules or components is implemented as software, or partially in software/firmware, the executable instructions may be stored in the operatively coupled, non-volatile, non-transitory memory 203, that may be accessed by the one or more processors 200 as needed.

Therefore, it is to be understood that any of the above described example modules or components in the example device 100 may be implemented as software (i.e. executable instructions or executable code) or firmware (or a combination of software and firmware) executing on one or more processors, or using ASICs (application-specific-integrated-circuits), DSPs (digital signal processors), hardwired circuitry (logic circuitry), state machines, FPGAs (field programmable gate arrays) or combinations thereof. Therefore the device 100 illustrated in FIG. 2 and described herein provides just one example embodiment and is not to be construed as a limitation on the various other possible implementations that may be used in accordance with the various embodiments.

As further examples, the thermal signature detection module 251 and/or the user voice direction module 252 and/or the voice recognition module 253, individually or in any combination of two modules thereof, may be implemented as a single component or may be implemented as any combination of DSPs, ASICs, FPGAs, CPUs running executable instructions, hardwired circuitry, state machines, etc., without limitation. Therefore, as one example embodiment, thermal signature detection module 251 and voice direction module 252 may be integrated together and may be implemented using an ASIC or an FPGA that may be operatively coupled to the one or more processors 200. These example embodiments and other embodiments are contemplated by the present disclosure.

The thermal signature detection module 251 is operative to receive thermal sensor data 254 from the sensor processor 221 over the internal communications buses 201. The thermal sensor data 254 may be data received from any of the thermal IR sensors 101 located at any one of the four corners of the device 100. The thermal signature detection module 251 is also operative to communicate with the voice direction module 252 via an API of libraries 231, to receive direction information related to voice commands detected by the voice recognition module 253. The voice recognition module 253 may communicate with the voice direction module 252 via one or more APIs of libraries 231 to send and receive data and commands. For example, the voice recognition module 253 may send an indication of a valid command to the voice direction module 252 which may then communicate the voice direction information to the thermal signature detection module 251.

Figure 3:
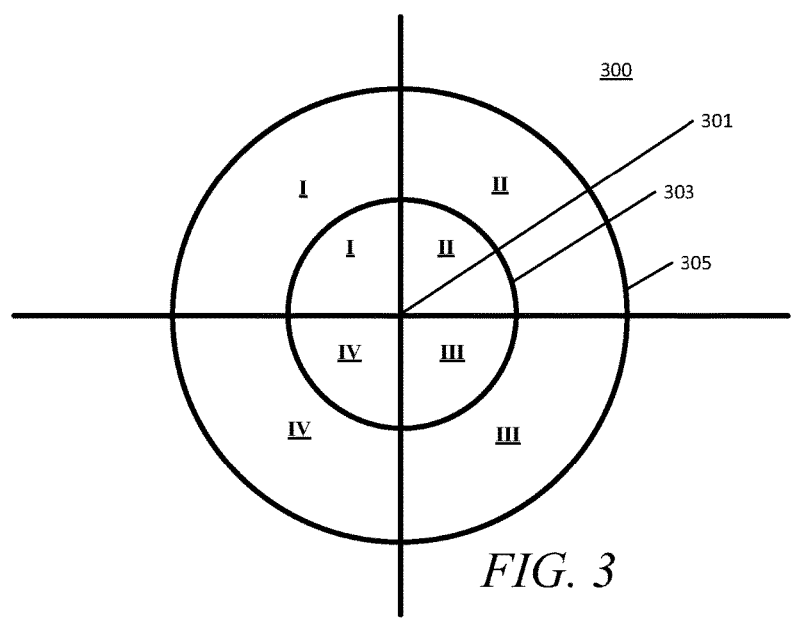
FIG. 3 is a chart showing operation of heat signature detection in accordance with an embodiment.

The FIG. 3 chart 300 illustrates thermal signature detection ranges for the device 100 using the thermal IR sensors 101 in one embodiment. In the chart 300, the axis intersection 301 represents the position of the device 100. An inner circular region 303 and an outer circular region 305 are each divided into four quadrants which are represented by Roman numeral I through IV. Each quadrant relates to one of the thermal IR sensors 101 such as those positioned at the four corners of the device 100 as illustrated in FIG. 1. For one type of thermal IR sensor in one example embodiment, the inner circular region 303 may represent a thermal detection range of approximately two feet while the outer circular region 305 may represent a thermal proximity range of approximately eight feet.

In some embodiments, the inner circular region 303 may represent a detected thermal presence and the outer circular region 305 may represent detected motion. In other words, if any of the thermal IR sensors 101 is triggered by external temperatures the thermal IR sensor 101 corresponding the one of the four quadrants, and to either the inner circular region 303 or the outer circular region 305, then the sensor processor 221 will send the appropriate indications to the thermal signature detection module 251 as thermal sensor data 254.

If the voice direction module 252 is invoked to determine the direction of voice for a valid voice command received by the voice recognition module 253, the voice direction module 252 may communicate the direction information to the thermal signature detection module 251 as a quadrant number. In that case, if the thermal signature detection module 251 can detect a distinguishable thermal presence in the designated quadrant it can proceed to associate that detected thermal presence with the device 100 user.

It is to be understood that, although the chart 300 is shown as circular and is divided into quadrants, the chart 300 is an example only and other ways of sectionalizing an area around a device 100 may be used. The sectionalizing used may depend on, among other factors, thermal IR sensor sensitivity, resolution, range, number of sensors utilized, etc. For example, in some embodiments, as single sensor may be used and the area surrounding the device 100 may be considered to be a grid area having square or rectangular grid regions. In another example, eight thermal IR sensors 101 may be incorporated into the device 100 and the chart 300 may be divided into eight sections rather than four. Other examples will be apparent to those of ordinary skill in light of the above examples and the present disclosure and such example are contemplated as embodiments by the present disclosure.

It is also to be understood that, although the example chart 300 is divided into quadrants, there may be more than one quadrant (and therefore more than one corresponding thermal IR sensor) that "lights up" or is activated at any one time. In other words, a person in the area of quadrant II but near the boundary of quadrant I may cause the corresponding thermal IR sensors 101 for both quadrants to detect temperature and to output thermal sensor data 254 of different intensities from each respective thermal IR sensor 101. In some cases, all four thermal IR sensors 101 may provide thermal sensor data 254 of varying intensities. Therefore, the thermal signature detection module 251 is operative to determine, based on the differing intensities of thermal sensor data 254 received for each of the four quadrants, which quadrant the use is actually located. Therefore in instances where two or more people are located in the same quadrant, it may not be possible to distinguish an individual thermal signature so as to identify the user.

Figure 4:
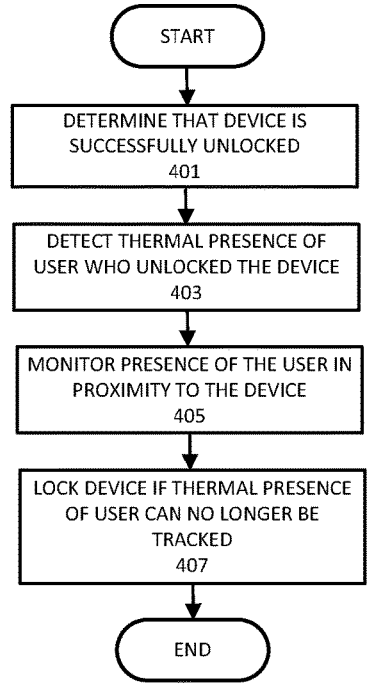
FIG. 4 is a flow chart of a process in a device in accordance with the embodiments.

FIG. 4 is a flowchart of a process or method of operation in a device 100 in accordance with the embodiments and provides further details of the above described operations. In operation block 401, the one or more processors 200 determine that a lockable device has been successfully unlocked. In one example embodiment, the one or more processors 200 determine that the device 100 has been unlocked. In another embodiment where the device 100 provides additional security for the lockable device 103, the lockable device 103 may send an indication to the device 100 over the wireless interface 105 to inform the one or more processors 200 that the lockable device 103 has been unlocked.

In operation block 403, the one or more processors 200 will obtain thermal sensor data 254 from the thermal IR sensors 101 and will attempt to detect the thermal presence of the user who unlocked the device. For example, if the user unlocked device 100 using a touchscreen capability, then the one or more processors 200 will be able to detect the thermal signature of the user within a first proximity range corresponding to the inner circular region 303. If the user has unlocked the device 100 using a voice command, then the one or more processors 200 may detect the thermal signature of the user within either a first proximity range corresponding to the inner circular region 303 or a second proximity range corresponding to the outer circular region 305.

In some embodiments, the thermal IR sensors 101 may be used to attempt to detect the thermal presence of a user who unlocked the external lockable device 103. The lockable device 103 may also include proximity sensors and may send proximity data to the device 100 over the wireless interface 105 in some embodiments. In other words, the device 100 and lockable device 103 may implement a legacy proximity based security mechanism that is enhanced by using the presently disclosed thermal presence security mechanism on top of, or in conjunction with, the legacy proximity based security mechanism.

In operation block 405, the one or more processors 200 will monitor the presence of the user using the IR sensors 101. In operation block 407, the one or more processors 200 will lock the device 100 if the thermal presence of the user can no longer be tracked. In embodiments where the device 100 controls lockable device 103, the device 100 may transmit a command signal over the wireless interface 105, to the lockable device 103, to cause the lockable device 103 to be placed in a locked state.

Figure 5:
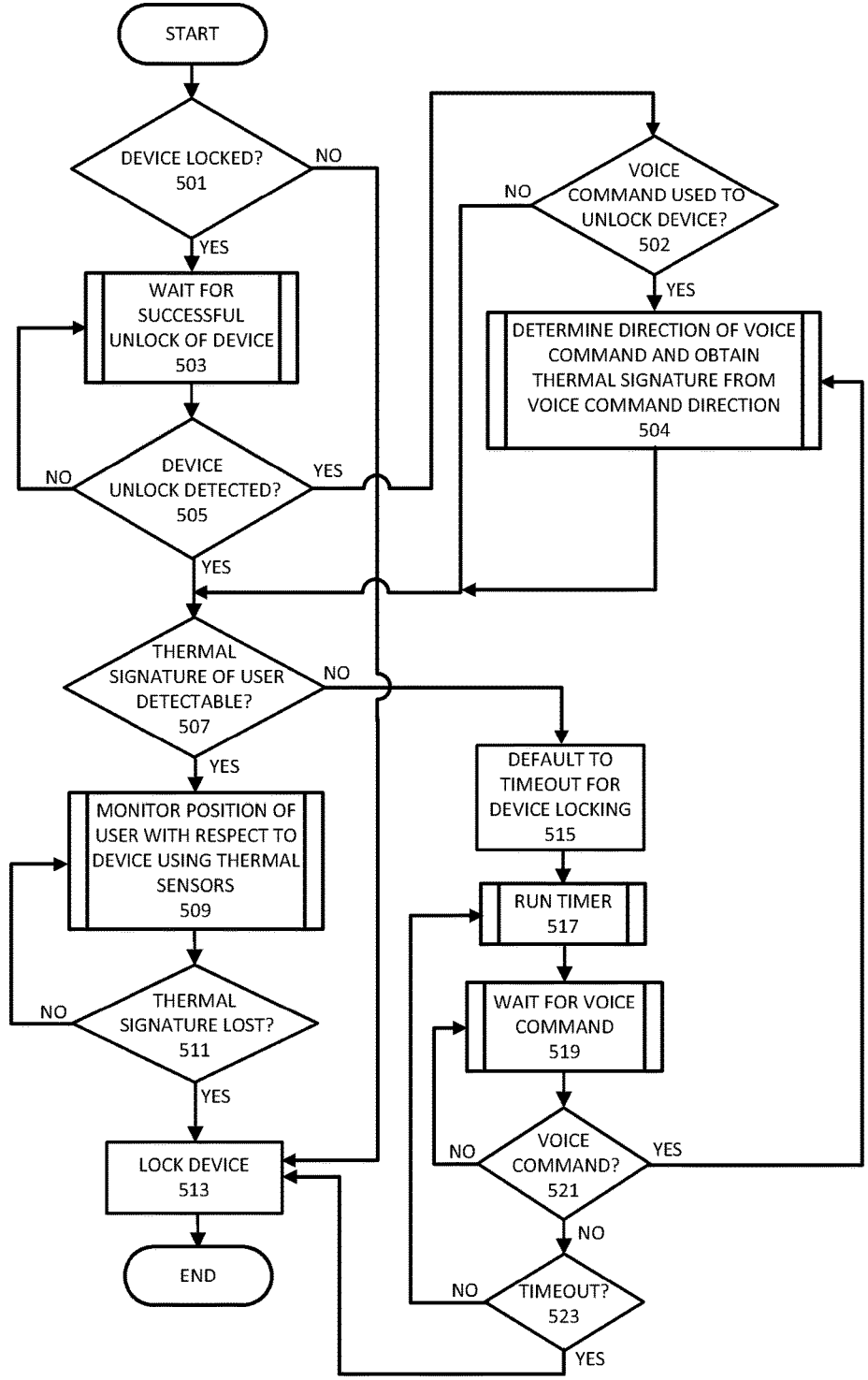
FIG. 5 is a flow chart of a process in a device in in accordance with an embodiment.

FIG. 5 is a flowchart of a process or method of operation in a device such as device 100 in accordance with an embodiment. The method of operation begins and, in decision block 501, the one or more processors 200 execute the thermal signature detection code 241 to run and implement the thermal signature detection module 251. In decision block 501, the thermal signature detection module 251 determines whether the device is in a locked state. If the device is not in a locked state in decision block 501, then the method of operation jumps to operation block 513 and locks the device. If the device is locked in decision block 501, then in operation block 503 the thermal signature detection module 251 waits for successful unlocking of the device. The unlocking of the device may be accomplished in various ways such as by entering a password or by using a voice command. As long as a successful device unlocking procedure is not detected in decision block 505, the thermal signature detection module 251 continues to wait for the successful unlock in operation block 503. If a successful device unlocking is detected in decision block 505, then the method of operation proceeds to decision block 502 and decision block 507.

In decision block 507, the thermal signature detection module 251 checks whether the thermal signature for the user is detectable. For example, if multiple heat sources are present in the room, which may be caused by multiple people being present, then it may not be possible to distinguish the thermal signature of the specific user. In decision block 502, the thermal signature detection module 251 communicates with the voice direction module 252 and the voice recognition module 253 via appropriate APIs to determine whether a voice command was used to unlock the device. If a voice command was not used to unlock the device in decision block 502 then the method of operation reverts to decision block 507 and determines whether a thermal signature for the user can be detected.

However if voice command was used to unlock the device as determined in decision block 502 then, in operation block 504, the voice direction module 252 will determine the direction of the voice command and the thermal signature detection module 251 will attempt to obtain the thermal signature from the voice command direction. The method of operation will then proceed to decision block 507 and determine whether the thermal signature of the user is detectable in the direction of the voice command.

If the thermal signature of the user is not detectable in decision block 507, then in operation block 515 the one or more processors 200 will place the device in a default timeout condition such that the device will be locked after the timer expires. As shown in operation block 517, the timer begins to run. However, a voice command may be received before expiration of the timer as shown in operation block 519. If a voice command is not received at decision block 521 during the time interval, then the one or more processors 200 continue to wait for a voice command in operation block 519 during the timer interval. If a timeout occurs in decision block 523, then the method of operation proceeds to operation block 513 and locks the device.

If a voice command is received in decision block 521 prior to expiration of the timer in decision block 523, then the method of operation loops back to operation block 504 and the voice direction module 252 attempts to determine the direction of the voice command. The thermal signature detection module 251 attempts to obtain the thermal signature for the user from the voice command direction. The method of operation then proceeds to decision block 507 to determine whether the thermal signature of the user is detectable as was described above with respect to the primary path of the FIG. 5 flowchart.

If the thermal signature of the user is detectable in decision block 507, then the thermal signature detection module 251 will continue to monitor the position of the user by monitoring the position of the thermal signature using the thermal IR sensors 101 of the of the device as shown in operation block 509. As long as the thermal signature is not lost in decision block 511, then the method of operation continues to monitor the thermal signature position in operation block 509. However if the thermal signature is lost in decision block 511, then the method of operation locks the device as shown in operation block 513 and the method of operation terminates.

In decision block 511, the thermal signature may be lost due to various reasons. For example, if the user moves outside the detection range of the thermal IR sensors 101 of the device, then the thermal signature will be lost in decision block 511. In another example, if other persons surround or form a group around the user then the thermal signatures of those other persons will cause interference such that the thermal signature of the user will no longer be discernible from the group. In yet another example, if heat sources exist in the room such as heating vents or other heat sources that generate heat sufficient to generate heat signatures detectable by the thermal IR sensors 101 of the device, these other heat sources may also cause interference if the user comes within a close enough distance to such heat sources so that the thermal signature of the user may no longer be discernible. In any of those cases, the device is locked in operation block 513.

However as was described above, if the thermal signature of the user is not initially detectable in decision block 507, then the one or more processors 200 will initiate a timeout operation which gives the user an opportunity to use a voice command which may then further be used to identify the user's thermal signature and maintain the device in an unlocked state. The timer may be set for any suitable duration such as for example, ten seconds, thirty seconds, etc., up to as long as thirty minutes. However it is to be understood that the length of the timer creates a security risk if the user walks away from the device prior to the device being locked. Therefore, the default timeout operation beginning in operation block 515 and ending with decision block 523 is an optional procedure which may be omitted from the method of operation in some embodiments.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A device, comprising:
 a set of four thermal infrared (IR) sensors, each thermal IR sensor disposed at an approximate corner of the device such that each of the four corners of the device comprises a thermal IR sensor; and
 a processor, operatively coupled to the set of four thermal IR sensors, the processor operative to:
  determine that the device has been successfully unlocked by a user using a security procedure;
  obtain the user's thermal signature using thermal sensor data from the set of four thermal IR sensors;
  track the thermal signature within a thermal proximity range of the device to determine proximity of the user to the device; and
  maintain the device unlocked if the thermal signature is detectable within the thermal proximity range.

2. The device of claim 1, wherein the processor is further operative to:
 lock the device if the user's thermal signature can not be differentiated from other interfering thermal signatures in proximity to the device.

3. The device of claim 2, further comprising:
 a voice recognition module; and
 wherein the processor is operative to:
  wait for a voice command for a predetermined time interval, prior to locking the device;
  receive an indication from the voice recognition module that a voice command has been received;

obtain the user's thermal signature using thermal sensor data from the thermal IR sensors in the direction of the voice command; and maintain the device unlocked if the thermal signature is detectable within the thermal proximity range.

4. The device of claim 1, wherein the processor is further operative to:

lock the device if the user's thermal signature is not detected within the thermal proximity range of the device.

5. The device of claim 1, further comprising:

a user interface, operatively coupled to the processor; and wherein the processor is operative to determine that the device has been successfully unlocked by a user using a security procedure, by:

determining that the user has entered a password using the user interface.

6. The device of claim 1, further comprising:

a voice recognition module; and wherein the processor is operative to determine that the device has been successfully unlocked by a user using a security procedure, by:

determining that the user has unlocked the device using a voice command detected by the voice recognition module;

determining the position of the user with respect to the device by locating the direction of the voice command; and obtaining the user's thermal signature using thermal sensor data from the set of thermal IR sensors in the direction of the voice command.

7. The device of claim 1, wherein the set of four thermal IR sensors comprise a first thermal proximity range and a second thermal proximity range that is greater than the first thermal proximity range.

8. The device of claim 7, wherein the set of four thermal IR sensors define four thermal proximity quadrants around the device and the processor is further operative to track the thermal signature within the four thermal proximity quadrants.

9. The device of claim 8, wherein the first thermal proximity range is approximately two feet from the device and the second thermal proximity range is approximately eight feet from the device.

10. The device of claim 8, wherein the processor is operative to identify the user's thermal signature within the second thermal proximity range using voice recognition and identifying the user's voice within the quadrant in which a thermal signature is detected to associate the detected thermal signature with the user.

11. The device of claim 7, wherein the processor is operative to obtain the user's thermal signature when the user is present within the first thermal proximity range after operation of the security procedure to unlock the device.

12. A method, comprising:

determining that an electronic device has been successfully unlocked by a user using a security procedure;

obtaining the user's thermal signature using thermal sensor data from a set of four thermal infrared (IR) sensors where each thermal IR sensor is disposed at an approximate corner of the electronic device such that each of the four corners of the electronic device comprises a thermal IR sensor;

tracking the thermal signature within a thermal proximity range of the electronic device to determine proximity of the user to the electronic device; and maintaining the device unlocked if the thermal signature is detectable within the thermal proximity range.

13. The method of claim 12, further comprising:

locking the device if the user's thermal signature can not be differentiated from other interfering thermal signatures in proximity to the device.

14. The method of claim 13, further comprising:

waiting for a voice command for a predetermined time interval, prior to locking the device;

receiving a voice command;

obtaining the user's thermal signature using thermal sensor data from the thermal IR sensors in the direction of the voice command; and maintaining the device unlocked if the thermal signature is detectable within the thermal proximity range.

15. The method of claim 12, further comprising:

locking the device if the user's thermal signature is not detected within the thermal proximity range of the device.

16. The method of claim 12, wherein determining that an electronic device has been successfully unlocked by a user using a security procedure, comprises:

determining that the user has entered a password using a user interface of the device.

17. The method of claim 12, wherein determining that an electronic device has been successfully unlocked by a user using a security procedure, comprises:

determining that the user has unlocked the device using a voice command;

determining the position of the user with respect to the device by locating the direction of the voice command; and obtaining the user's thermal signature using thermal sensor data from the set of thermal infrared (IR) sensors in the direction of the voice command.

18. A device, comprising:

a set of four thermal infrared (IR) sensors, each thermal IR sensor disposed at an approximate corner of the device such that each of the four corners of the device comprises a thermal IR sensor; and a processor, operatively coupled to the set of four thermal IR sensors, the processor operative to:

detect human thermal signatures using the set of four thermal IR sensors, within a thermal proximity range of the device and within four quadrants, where each quadrant is defined by one of the thermal IR sensors;

detect a user's thermal signature using the set of thermal IR sensors upon the user unlocking the device using a security procedure such that the user is within the thermal proximity range of the device;

track the thermal signature within the four quadrants and within the thermal proximity range of the device;

maintain the device unlocked if the thermal signature is detectable within the thermal proximity range; and lock the device if the thermal signature is not detected within the thermal proximity range.

19. The device of claim 18, further comprising:

a voice direction module operative to determine the direction of a detected voice with respect to the device;

a voice recognition module, operative to identify a user's voice; and wherein the processor is operative to identify the user's thermal signature using the voice recognition module and the voice direction module to identify the user's voice within a quadrant in which a thermal signature is detected to associate the detected thermal signature with the user.

20. The device of claim 18, wherein the thermal proximity range of the device is approximately eight feet from the device.

\* \* \* \* \*